(12) United States Patent
Seo

(10) Patent No.: US 9,565,280 B2
(45) Date of Patent: Feb. 7, 2017

(54) ANTIFUNGAL COVER AND ELECTRONIC DEVICE INCLUDING THE SAME

(71) Applicant: Samsung Electronics Co., Ltd., Gyeonggi-do (KR)

(72) Inventor: Jeong-Hun Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 6 days.

(21) Appl. No.: 14/688,297

(22) Filed: Apr. 16, 2015

(65) Prior Publication Data

US 2015/0304467 A1    Oct. 22, 2015

(30) Foreign Application Priority Data

Apr. 16, 2014  (KR) .................. 10-2014-0045584

(51) Int. Cl.
*H04M 1/00* (2006.01)
*H04M 1/17* (2006.01)
*H04M 1/725* (2006.01)
*H04M 1/02* (2006.01)

(52) U.S. Cl.
CPC ............ *H04M 1/17* (2013.01); *H04M 1/0245* (2013.01); *H04M 1/72527* (2013.01); *H04M 1/0214* (2013.01); *H04M 1/0254* (2013.01); *H04M 2250/22* (2013.01)

(58) Field of Classification Search
CPC .......... H04M 1/0214; H04M 1/0245; H04M 1/0254; H04M 1/17; H04M 1/72527; H04M 2250/22
USPC ................... 455/575.3, 575.8; 345/173
See application file for complete search history.

(56) References Cited

U.S. PATENT DOCUMENTS

| 5,202,348 | A  | * | 4/1993  | Towers ............... | C07D 409/06 |
|-----------|----|---|---------|---------|----|
|           |    |   |         |         | 514/436 |
| 5,848,152 | A  | * | 12/1998 | Slipy .................. | H04M 1/0216 |
|           |    |   |         |         | 379/433.1 |
| 6,242,752 | B1 | * | 6/2001  | Soma .................. | H01J 61/35 |
|           |    |   |         |         | 250/504 R |
| 6,653,356 | B2 | * | 11/2003 | Sherman ............ | B01J 13/0047 |
|           |    |   |         |         | 423/610 |
| 7,713,955 | B2 | * | 5/2010  | Whiteford ........... | A01N 43/90 |
|           |    |   |         |         | 514/183 |
| 2002/0042291 | A1 | * | 4/2002 | Lahteenmaki ...... | H04M 1/0202 |
|           |    |   |         |         | 455/566 |
| 2003/0096582 | A1 | * | 5/2003 | Kim ................... | H04M 1/0247 |
|           |    |   |         |         | 455/90.3 |
| 2003/0235605 | A1 | * | 12/2003 | Lelah ................. | A01N 25/18 |
|           |    |   |         |         | 424/443 |
| 2005/0186911 | A1 | * | 8/2005 | Chen .................... | H04M 1/17 |
|           |    |   |         |         | 455/66.1 |
| 2010/0053101 | A1 | * | 3/2010 | Nozawa .............. | G02B 1/105 |
|           |    |   |         |         | 345/173 |

(Continued)

FOREIGN PATENT DOCUMENTS

KR    20-0198713    7/2000
KR    20-2012-0004497    6/2012

*Primary Examiner* — Charles Shedrick
(74) *Attorney, Agent, or Firm* — The Farrell Law Firm, P.C.

(57) ABSTRACT

An electronic device for rendering a display unit antifungal. The electronic device includes a body including a display unit; and an antifungal cover that is removeably attached to the body, the antifungal cover including an antifungal module on one surface thereof. If the antifungal cover covers the display unit, the display unit projects a wavelength of light that activates an antifungal property of the antifungal module.

20 Claims, 6 Drawing Sheets

(56) References Cited

U.S. PATENT DOCUMENTS

| | | | |
|---|---|---|---|
| 2011/0052662 A1* | 3/2011 | Nakano | A61L 2/232 |
| | | | 424/443 |
| 2011/0136660 A1* | 6/2011 | Terasaki | B01J 21/06 |
| | | | 502/159 |
| 2011/0216029 A1* | 9/2011 | Jin | C08J 7/123 |
| | | | 345/173 |
| 2014/0106961 A1* | 4/2014 | Nakai | B01J 37/0219 |
| | | | 502/159 |
| 2014/0267116 A1* | 9/2014 | Weiner | A61F 5/05866 |
| | | | 345/173 |

* cited by examiner

ANTIFUNGAL COVER AND ELECTRONIC DEVICE INCLUDING THE SAME

PRIORITY

This application claims priority under 35 U.S.C. §119(a) to Korean Patent Application Serial No. 10-2014-0045584, which was filed in the Korean Intellectual Property Office on Apr. 16, 2014, the entire content of which is hereby incorporated by reference.

BACKGROUND

1. Field of the Invention

The present invention generally relates to an electronic device including an antifungal cover.

2. Description of the Related Art

Commonly, a display, such as touch screen display, is provided on a front surface of an electronic device such that a user can use the many functions of the electronic device. For example, a smart phone is often provided with a large-scale touch screen display on a front surface thereof.

Based on the intended use of the electronic device, a user's hand often contacts a display screen of the electronic. Further, because the display is provided on one surface of the electronic device, it is often exposed to various external environments. Accordingly, due to exposure to certain external environments or contact with a user's hand, foreign substances may be left on the display. For example, a fingerprint may be left on the display after contacts with a user's finger, contaminants from the user's hand may be directly transferred onto the display, and various environmental external contaminants may be transferred onto the display.

To address these issues, users may directly apply an antifungal substance to the display or attach a film having an antifungal effect to reduce any contaminants. That is, in order to lower contamination generated due to frequent contacts or an environment exposed to the outside, an antifungal effect of the display unit must be improved with separate costs.

However, when a separate antifungal substance is applied to the display unit, a bonding force of the applied antifungal substance is lowered as the antifungal substance is applied on an Anti-Fouling (AF) coated display. Accordingly, a bonding force of the antifungal substance applied to the display unit is lowered so that a predetermined antifungal effect cannot be obtained.

SUMMARY

The present invention has been made to address the above-mentioned problems and disadvantages, and to provide at least the advantages described below.

Accordingly, an aspect of the present invention is to provide an electronic device for lowering contaminations generated due to frequent contacts or exposure to the outside, particularly, an apparatus for rendering a display unit antifungal.

In accordance with an aspect of the present invention, there is provided an electronic device for rendering a display unit antifungal. The electronic device includes a body including a display unit; and an antifungal cover that is removeably attached to the body, the antifungal cover including an antifungal module on one surface thereof. If the antifungal cover covers the display unit, the display unit projects a wavelength of light that activates an antifungal property of the antifungal module.

In accordance with another aspect of the present invention, there is provided an electronic device for rendering a display unit antifungal. The electronic device includes a body including a display unit; an antifungal cover that is removeably attached to the body, the antifungal cover including an antifungal module on one surface thereof; a detection module configured to detect that the antifungal cover is attached to the body; and a controller configured to execute an antifungal mode when the detection module detects that the antifungal cover is attached to the body. When the antifungal mode is executed, the display unit provides a wavelength of light that activates an antifungal property of the antifungal module.

In accordance with another aspect of the present invention, there is provided an antifungal cover provided in an electronic device. The antifungal cover includes a rear cover that couples to a rear surface of the electronic device; a front cover that is hingedly connected to the rear cover and covers a display unit on a front surface of the body, when folded closed; and an antifungal module provided on one surface of the front cover facing the display unit.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1A:
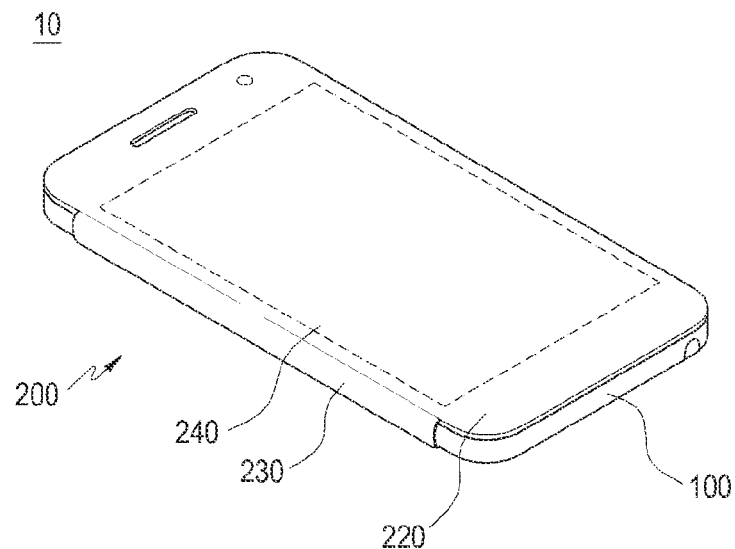
FIGS. 1A and 1B illustrate an electronic device including an antifungal cover according to an embodiment of the present invention.

The present invention may have various modifications and various embodiments, among which embodiments are described in detail with reference to the accompanying drawings. However, the embodiments do not limit the present invention to a specific implementation, but should be construed as including all modifications, equivalents, and replacements included in the spirit and scope of the present invention.

Although the terms including an ordinal number such as first, second, etc. can be used for describing various elements, the structural elements are not restricted by the terms. The terms are only used to distinguish one element from another element. For example, without departing from the scope of the present invention, a first structural element may be named a second structural element. Similarly, the second structural element also may be named the first structural element. As used herein, the term "and/or" includes any and all combinations of one or more associated items.

The relative terms, such as a front surface, a rear surface, an upper surface, and a lower surface, which are described with reference to the drawings may be replaced by ordinal numbers such as first and second. In the ordinal numbers such as first and second, their order is determined in the mentioned order or arbitrarily and may not be arbitrarily changed if necessary.

The terms used in this application merely are for the purpose of describing embodiments of the present invention and are not intended to limit the present invention. Singular forms are intended to include plural forms unless the context clearly indicates otherwise. In the present invention, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined differently, all terms used herein, which include technical terminologies or scientific terminologies, have the same meaning as that generally understood by a person skilled in the art to which the present invention belongs. It should be interpreted that the terms, which are identical to those defined in general dictionaries, have the meaning identical to that in the context of the related technique. The terms should not be ideally or excessively interpreted as a formal meaning.

In the present invention, an electronic device may refer to a terminal, a portable terminal, a mobile terminal, a communication terminal, a portable communication terminal, a portable mobile terminal, a display device, and the like.

For example, the terminal may be a smart phone, a portable phone, a game player, a Television (TV), a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Also, the terminal may be a flexible device or a flexible display device.

Hereinafter, an antifungal cover provided in an electronic device 10 illustrated in FIGS. 1A and 1B according to an embodiment of the present invention is described as a flip cover. However, the antifungal cover according to an embodiment of the present invention is not limited to a flip cover. For example, any cover which can cover a display unit 120 and provide an antifungal module 240 on one surface thereof in correspondence to the display unit 120 can be adopted as the antifungal cover. Further, in the present invention, the antifungal cover is a one-piece type flip cover coupled such that the flip cover directly covers a rear surface of a body 110 of the electronic device 10.

Figure 1B:
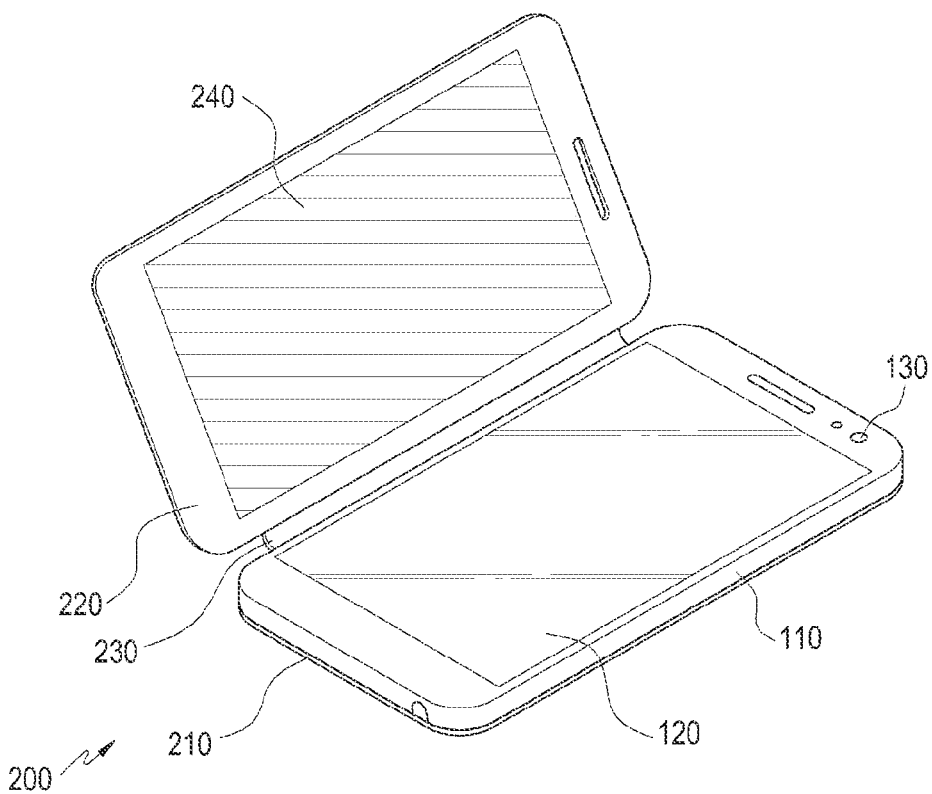
Figure 2:
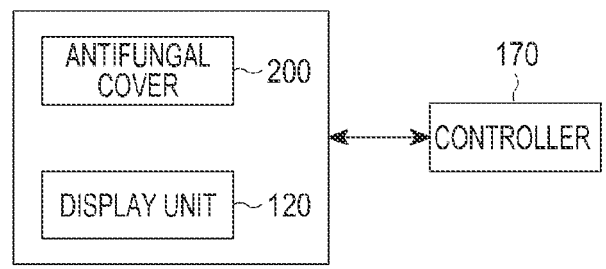
FIG. 2 is a block diagram illustrating an electronic device including an antifungal cover according to an embodiment of the present invention.

FIGS. 1A and 1B illustrate an electronic device 10 including an antifungal cover 200 according to an embodiment of the present invention. FIG. 2 is a block diagram illustrating the electronic device 10 of FIGS. 1A and 1B including an antifungal cover 200 according to an embodiment of the present invention.

Referring to FIGS. 1A, 1B, and 2, the electronic device 10 including an antifungal cover 200 according to the embodiment of the present invention includes a body 110 and an antifungal cover 200, and it may further include a general cover (not shown) and a controller 170. The term "a general cover" used in the present invention generally refers to all covers other than the antifungal cover 200, and it may refer to an element which is provided to an electronic device 10 to cover the electronic device 10.

The body 110 according to an embodiment of the present invention has a bar shape, and it has a large scale display unit 120 on a front surface thereof and a battery (not shown) is mounted to a rear surface thereof. The display unit 120 is a touchable display device which allows an input according to a contact or an approach.

The body 110 according to an embodiment of the present invention includes a detector 190 of a detection module 390 which can recognize mounting of an antifungal cover 200, which are described below in FIGS. 7 and 8, and a general cover (see FIGS. 3 and 4). The detector 190 recognizes a signal unit 290 provided to the antifungal cover 200, which is described below, and detects mounting of the antifungal cover 200 according to the presence of the signal unit 290. The detector 190 may be provided to a rear surface of the body 110, in more detail, a rear case having a battery mounting space. However, the mounting location of the detector 190 is not limited thereto. The location of the detector 190 may be arbitrarily changed or modified as long as the detector 190 can detect that the antifungal cover 200 is provided to the body 110, and for example, the detector 190 may be provided on a side surface of the body 110 or may be provided at a periphery of the display unit 120. For example, the detector 190 may be provided along a peripheral circumference of the display unit 120, and as is described below, the signal unit 290 operating with the detector 190 may be provided at a peripheral circumference of the antifungal module 240 to be engaged with the detector 190 (S100 in FIG. 9). Thus, an antifungal mode M may be executed as it is recognized that the antifungal cover 200 is mounted to the display unit 120.

Figure 7:
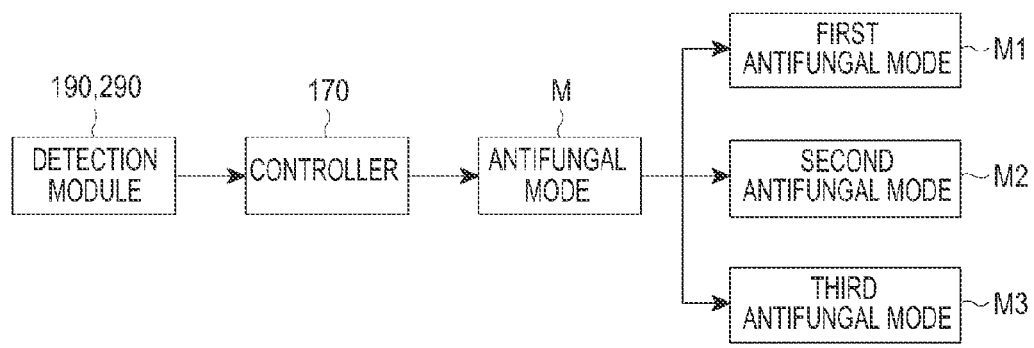
FIG. 7 is a block diagram illustrating an antifungal cover according to an embodiment of the present invention.

The body 110 includes a controller 170 (see FIGS. 2 and 7). The controller 170 receives a value detected by the detector 190 and controls such that light may be projected through the display unit 120 of the body 110 according to the set mode. That is, the controller 170 controls such that the body 110 provided with the antifungal cover 200 is executed in the antifungal mode M.

Although the present invention discloses that the controller 170 may control the display unit 120 according to the set mode as the detector 190 detects coupling of the antifungal cover 200, the present invention is not limited thereto. For example, even if the detector 190 for detecting attachment of the antifungal cover 200 or if the signal unit 290 is not provided separately, the controller 170 may control such that the antifungal mode M is executed according to a setting of the user. That is, it may be controlled such that the antifungal mode M is executed through the setting of a user, for example, a configuration such as an antifungal application, by which the antifungal mode M may be executed. Thus, various modifications or performances are possible—for example, the controller 170 may control the antifungal mode M according to attachment of the antifungal cover 200, and the antifungal mode M may be controlled according to the setting of the user.

The detector 190 according to the embodiment of the present invention includes a sensor such as a pressure sensor or a Hall sensor, and as is described below, when the detector 190 includes a pressure sensor, the signal unit 290, which is described below, may be formed of a boss by which a signal may be applied to the pressure sensor. When the detector 190 includes a Hall sensor, the signal unit 290, which is described below, includes a magnetic body which can apply a signal to the Hall sensor. The details of the detector 190 are described in more detail below along with the detection module 390.

Figure 3:
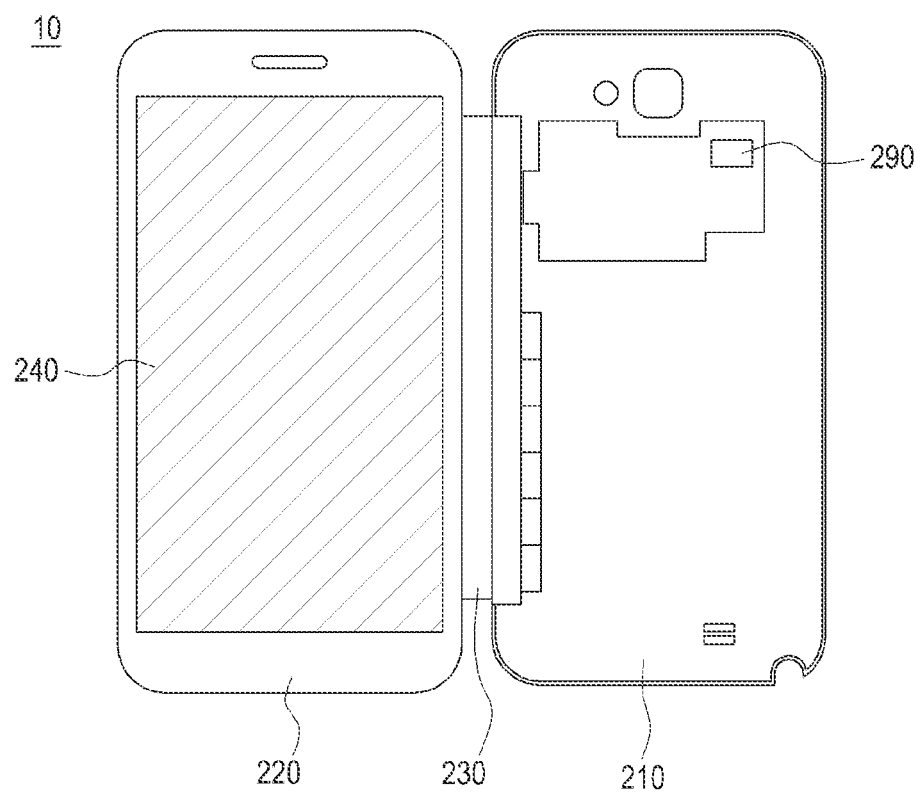
FIG. 3 illustrates an antifungal cover according to an embodiment of the present invention.

FIG. 3 illustrates the antifungal cover according to an embodiment of the present invention. FIG. 4 illustrates a state in which the antifungal cover is coupled to the electronic device according to an embodiment of the present invention.

Figure 4:
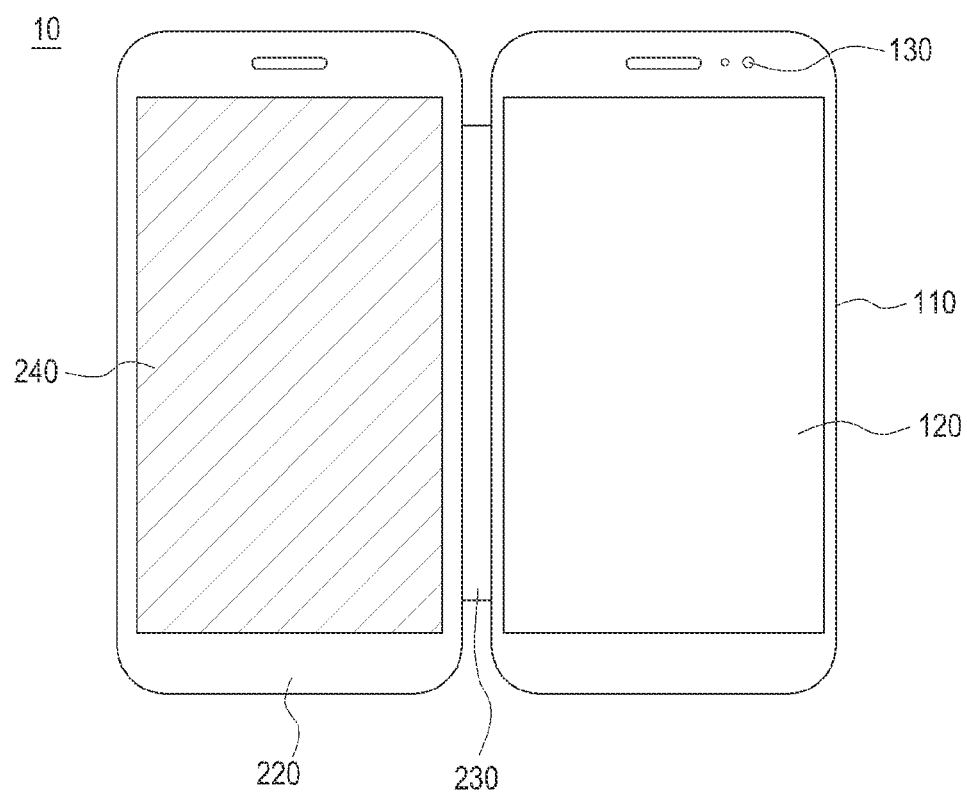
FIG. 4 illustrates an antifungal cover coupled to an electronic device according to an embodiment of the present invention.

Referring to FIGS. 3 and 4, as described above, the antifungal cover 200 according to an embodiment of the present invention includes a flip cover. Accordingly, the antifungal cover 200 according to an embodiment of the present invention includes a front cover 220 and a rear cover 210.

The front cover 220 covers the display unit 120 of the body 110, and it is rotated from the rear cover 210 to switch on or off the display unit 120 according to an in-use state thereof. The antifungal module 240 is provided on the inner side of the front cover 220, in more detail, on an inner surface of the front cover 220 facing the display unit 120.

The antifungal module 240 according to an embodiment of the present invention has a size corresponding to that of the display unit 120. Thus, if the front cover 220 covers a front surface of the body 110, the antifungal module 240 and the display unit 120 face each other while having the same size. However, the size of the antifungal module 240 may be modified according to the form, configuration, or location of the front cover 220. For example, when a transparent window (not shown) is provided to the front cover 220 such that a portion of the display unit 120 can be viewed, an antifungal substance a may be provided in the front cover 220 except for the transparent window. In this case, only the display unit 120 except for a portion where the transparent window is formed may be made antifungal, or although not shown, a foldable antifungal module (not shown) may be further provided at the portion where the transparent window is formed. For example, when the foldable antifungal module 240 is provided, the foldable antifungal module may extend from an end of the antifungal module 240 and may be folded in the transparent window area.

Figure 6:
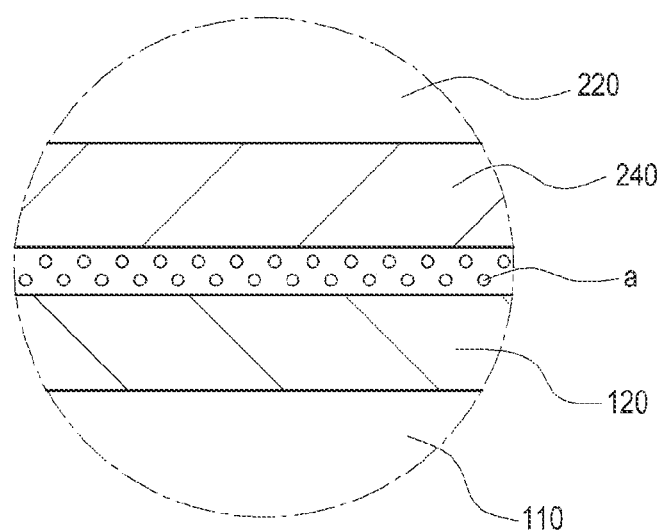
FIG. 6 illustrates an enlarged partial view of FIG. 5B.

In detail, the foldable antifungal module is folded so as not to cover the transparent window portion in a general in-use environment, and the folded portion of the foldable antifungal module is spread out to cover the transparent window portion in an in-use environment of the antifungal mode M. Thus, an area of the display unit 120 may be identified through the transparent window in a general in-use environment, and the foldable antifungal module is spread out to be located at the transparent window portion in the in-use environment of the antifungal mode M such that the antifungal module faces the entire display unit 120. Accordingly, light of a wavelength is projected from the display unit 120, the antifungal module 240 facing the portions other than the transparent window and the foldable antifungal module at the transparent window portion react with light such that the entire display unit 120 may be made antifungal while the antifungal substance "a" illustrated in FIG. 6 is applied on the display unit 120.

The rear cover 210 covers a rear surface of the body 110, in detail, the rear case, and may be coupled along a peripheral circumference of the rear case. The front cover 220, which is described above, is rotatably connected to one side of the rear cover 210 by a connecting member 230. The rear cover 210 according to the embodiment of the present invention is directly coupled to the rear case of the body 110. The rear cover 210 is directly coupled to the rear case provided with a battery mounting part to form a rear surface of the electronic device 10. The rear cover 210 includes a signal unit 290 of the detection module 390, which is described below.

The signal unit 290 is provided on an inner surface of the rear cover 210 to correspond to the detector 190 provided in the body 110, and is provided such that the detector 190 recognizes coupling of the antifungal cover 200. As described above, the detector 190 according to an embodiment of the present invention may include one of a pressure sensor and a Hall sensor. Accordingly, the signal unit 290 may include a boss or a magnetic body which can apply a signal to the pressure sensor or the Hall sensor. The details are described below.

Figure 5A:
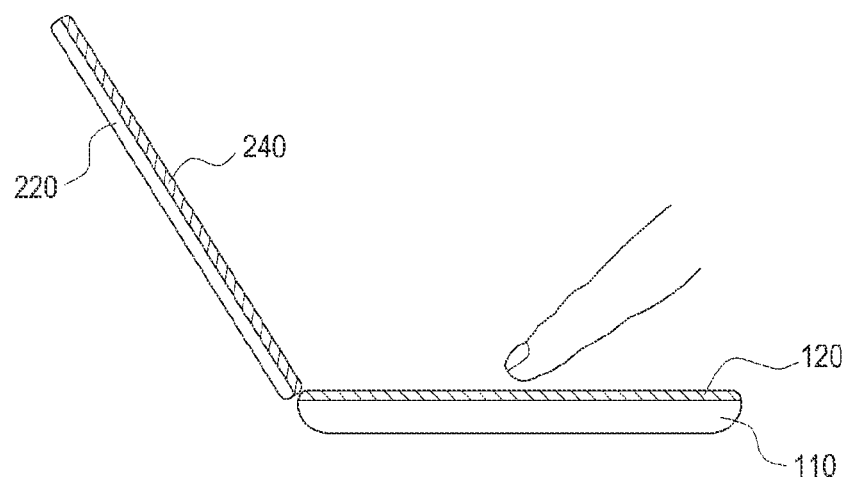
FIGS. 5A and 5B illustrate an in-use state and an antifungal state, respectively, of an electronic device including an antifungal cover according to an embodiment of the present invention.
Figure 5B:
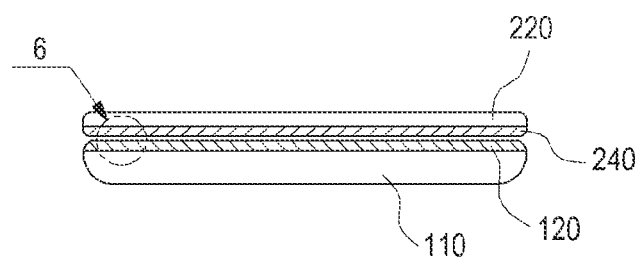

FIGS. 5A and 5B illustrate an in-use state and an antifungal state of the electronic device 10 including an antifungal cover 200 according to an embodiment of the present invention. FIG. 6 is an enlarged partial view of FIG. 5B.

Referring to FIGS. 5A, 5B, and 6, a user can realize various inputs through contacts with the display unit 120 while the front cover 220 is opened in a state in which the antifungal cover 200 is mounted to the body 110. Contaminants of a hand of the user may be directly transferred to a surface of the display unit 120. If the antifungal cover 200 covers the display unit 120 while the contaminants are left on the surface of the display unit 120, the antifungal module 240 contacts the display unit 120. Light having a wavelength may be projected to the display unit 120 according to the set antifungal mode M, which is described below.

As described above, the antifungal module 240 is activated by the light of a wavelength emitted from the display unit 120. The antifungal module 240 according to an embodiment of the present invention contains a photocatalyst including titanium dioxide ($TiO_2$). If titanium dioxide receives light having a wavelength of 385 nm (ultraviolet area), electrons are excited such that electrons and electron holes are formed to generate a hydroxyl radical (—OH) and a super oxide. The hydroxyl radical and super oxide react with germs attached to a surface of the display unit 120, that is, organic composites, to oxidize and decompose the organic composites, sterilizing contaminants attached to the display unit 120 to make the display unit 120 antifungal. Although it has been described that the antifungal module 240 according to the present invention reacts with light having a wavelength of a UV area and includes stable titanium dioxide, the present invention is not limited thereto. Any material which can sterilize contaminants through a reaction with light having a wavelength generated by the display unit 120 may be adopted, and for example, a photocatalyst such as titanium oxide reacting with a visual ray may be used.

FIG. 7 is a block diagram showing the antifungal cover 200 according to the embodiment of the present invention.

Referring to FIG. 7, the controller 170 activates the set antifungal mode M as a signal is recognized by the detector 190. That is, the controller 170 controls such that light of a wavelength is projected by the display unit 120. The antifungal mode M according to an embodiment of the present invention includes three cases. That is, the electronic device 10 may be set to at least one antifungal mode M as the antifungal cover 200 is mounted. The antifungal mode M according to an embodiment of the present invention may be set to at least one antifungal mode M of a first antifungal mode M1, a second antifungal mode M2, and a third antifungal mode M3.

The first antifungal mode M1 is a mode in which the antifungal cover 200 covers the display unit 120 and the display unit 120 is made antifungal. In more detail, the first antifungal mode M1 is a mode in which if the antifungal cover 200, more specifically, the front cover 220 covers the display unit 120, light can be projected by the display unit 120 for a predetermined time period as the front cover 220 covers the display unit 120. Thus, when the first antifungal mode M1 is set, light of a wavelength is projected for a predetermined time period if the front cover 220 covers the display unit 120. Accordingly, the antifungal module 240 reacting with a wavelength of light emits an antifungal substance "a" and the display unit 120 is sterilized by the emitted antifungal substance "a."

The second antifungal mode M2 is a mode in which the display unit 120 is made antifungal at a specific time set by the user. That is, the second antifungal mode M2 is set such that the display unit 120 projects light of a wavelength at a specific time, for example, at a time when use of the electronic device 10 is reduced. In detail, for example, if the user sets the specific time to 1 am, the controller 170 controls such that the display unit 120 projects light of a wavelength at a set time. For example, when the user sets two antifungal modes M to 4 am and 3 pm, the controller 170 controls such that the display unit 120 projects light of a wavelength for a predetermined time period at the set times.

Thus, because the display unit 120 projects light of a wavelength at the specified time, an antifungal substance "a" is emitted from the antifungal module 240 facing the display unit 120 according to the light projected from the display unit 120 and the emitted material is coupled to contaminants on a surface of the display unit 120, sterilizing the display unit 120.

The third antifungal mode M3 is a mode in which the antifungal cover 200 covers the display unit 120, and the display unit 120 is made antifungal for a predetermined time period after a predetermined time elapses from the time when the antifungal cover 200 covers the display unit 120. That is, if the front cover 220 covers the display unit 120, and then the front cover is opened any more after a lapse of a predetermined time period, the controller 170 controls such that the display unit 120 projects light of a wavelength. For example, if 10 minutes elapses while the front cover 220 covers the display unit 120, the display unit 120 projects light of a wavelength. Accordingly, if 10 minutes elapses after the user closes the front cover 220 to cover the display unit 120, the display unit 120 may project light of a wavelength for a predetermined time period. Accordingly, the antifungal module 240 facing the display unit 120 may emit the antifungal substance "a" to the specific wavelength. If the antifungal substance "a" is emitted, it reacts with contaminants on the display unit 120, and the contaminants are sterilized.

Figure 8:
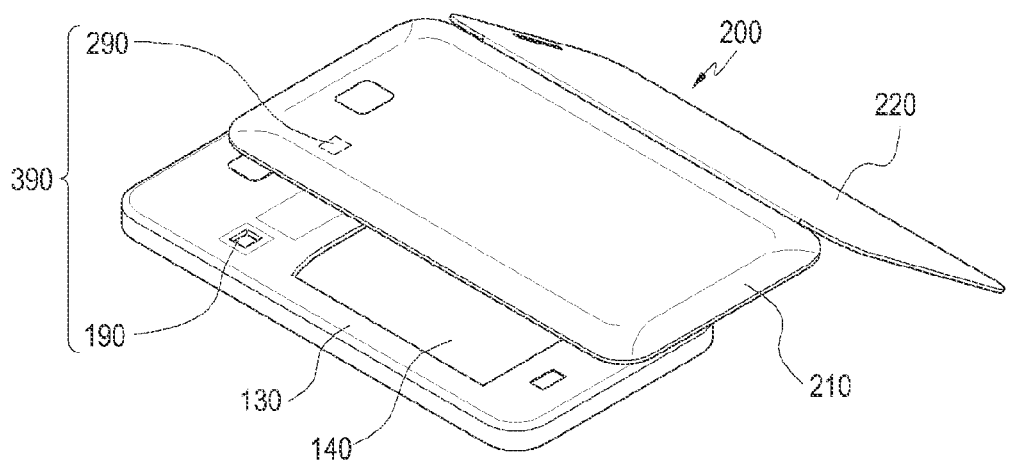
FIG. 8 illustrates a detection module of an electronic device including an antifungal cover according to an embodiment of the present invention.

FIG. 8 is a view showing a detection module of the electronic device including the antifungal cover according to an embodiment of the present invention.

Referring to FIG. 8, as described above, the detection module 390 is provided in the electronic device to detect whether the antifungal cover 200 is mounted to the body 110 to execute the antifungal mode M. The detection module 390 according to the embodiment of the present invention includes a detector 190 and a signal unit 290.

The detector 190 of the detection module 390 according to the embodiment of the present invention may include a pressure sensor, and the signal unit 290 may include a boss to press the pressure sensor. In detail, a pressure sensor may be provided on a rear surface of the body 110, that is, at a predetermined location of the rear case. A boss may be provided in the antifungal cover 200, in detail, inside the rear cover 210 to be engaged with the location of the pressure sensor. When the rear cover 210 is coupled to a rear case, because a general cover which is not provided with a boss does not provide a boss at a location of the pressure sensor, no signal is applied to the pressure sensor. Thus, no signal is applied to the controller 170 and no signal for executing the antifungal mode M is generated. Alternatively, the antifungal cover 200 is coupled to the body 110, and the boss provided in the rear cover 210 presses the pressure sensor provided in the rear case. If the pressure sensor presses the boss, a signal value applied to the pressure sensor is applied to the controller 170. The controller 170 executes the set antifungal mode M according to the applied signal value.

According to another embodiment of the present invention, the detector 190 of the detection module 390 includes a Hall sensor, and the signal unit 290 includes a magnetic body to react with the Hall sensor. In detail, a Hall sensor is provided on a rear surface of the body 110, that is, at a predetermined location of the rear case. A magnetic body is provided in the antifungal cover 200, in detail, inside the rear cover 210 to be engaged with the location of the pressure sensor such that the Hall sensor reacts. When the rear cover 210 is coupled to a rear case, a general cover which is not provided with a boss provides no signal to the Hall sensor. Thus, no signal is applied to the controller 170 and no signal for executing the antifungal mode M is generated. Alternatively, if the antifungal cover 200 is coupled to the body 110, the Hall sensor reacts with the magnetic body provided in the rear cover 210 to generate a signal. If a signal value is applied to the Hall sensor by the magnetic body, the controller 170 executes the set antifungal mode M according to the applied signal value. Although in an embodiment of the present invention the detector 190 and the signal unit 290 include a pressure sensor and a boss, the present invention is not limited thereto. For example, the detector 190 and the signal unit 290 may include a Hall sensor and a magnetic body. In detail, any configuration including a signal unit 290 having a signal and a detector 190 reacting with a signal may be employed, and for example, a Hall sensor is mounted to a rear surface of the body 110.

Further, the present invention may be controlled such that the antifungal mode M is executed without providing the detector 190 and the signal unit 290, which are described above. That is, the antifungal mode M may be controlled according to a setting of the user. For example, while the antifungal cover 200 is mounted to the body 110, the antifungal mode M is executed such that the user makes the display unit 120 antifungal through a setting of the user such as an antifungal application.

Figure 9:
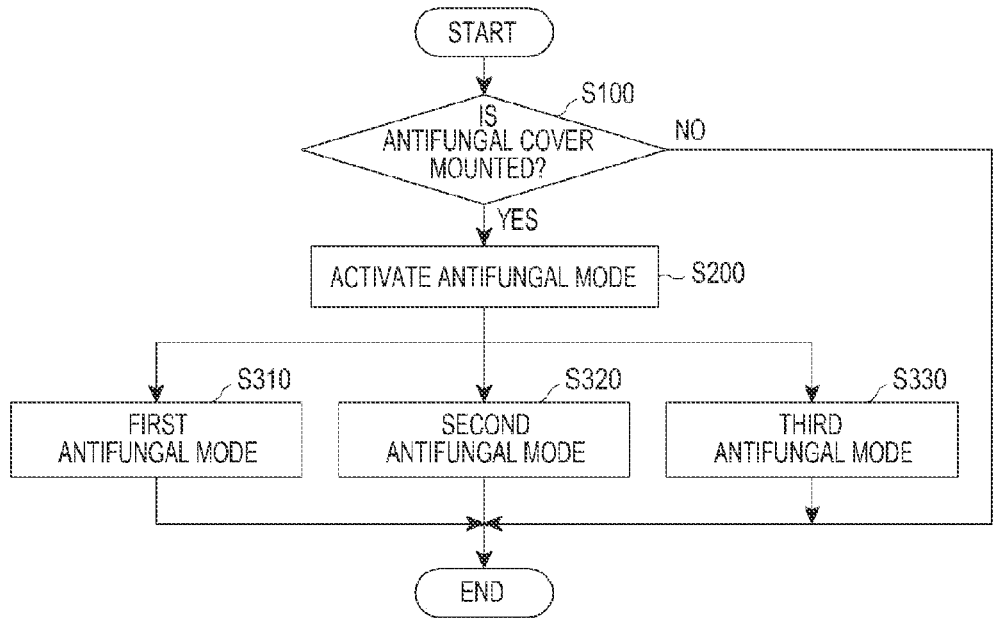
FIG. 9 is a flowchart illustrating an operation of an electronic device including an antifungal cover according to an embodiment of the present invention.

FIG. 9 is a flowchart showing an operation of the electronic device 10 including the antifungal cover 200 according to an embodiment of the present invention.

Referring to FIG. 9, first, the controller 170 controls execution of the antifungal mode M according to attachment of the antifungal cover 200 through the detection module 390. In detail, it may be detected first whether a signal by the signal unit 290 is recognized by the detector 190 (S100).

When a signal by the signal unit 290 is not applied to the detector 190, the antifungal cover 200 is not attached to the body or a general cover is attached to the body 110, and the antifungal mode M is not executed. In contrast, if a signal of the signal unit 290 is recognized by the detector 190, the recognized signal value is forwarded to the controller 170, and the controller 170 activates the antifungal mode M to execute the antifungal mode M (S200). Here, the activation refers to a preliminary state for driving the set antifungal mode M. If the antifungal mode M is activated, the display unit 120 is made antifungal according to at least one antifungal mode M set to the electronic device 10 (S310, S320, and S330).

For example, when the first antifungal mode M1 is set (S310), the first antifungal mode M1 is activated if the antifungal cover 200 is mounted to the body 110. Accordingly, the display unit 120 is made antifungal according to the first antifungal mode M1. That is, if the front cover 220 covers the display unit 120, the display unit 120 projects light of a wavelength from the moment when the front cover 220 covers the display unit 120. As the light of a wavelength is projected, the antifungal module 240 facing the display unit 120 emits the antifungal substance "a" due to the light of the wavelength, and the emitted antifungal material "a" sterilizes contaminants on a surface of the display unit 120 while contacting the surface of the display unit 120.

For example, when the second antifungal mode M2 is set (S320), the second antifungal mode M2 is activated if the antifungal cover 200 is mounted to the body 110. Accordingly, the display unit 120 is made antifungal according to the second antifungal mode M2. That is, when the user sets a time, for example, 1 am, the display unit 120 projects light of a wavelength for a predetermined time period at 1 pm. In this case, the user does not use the electronic device while the front cover 220 covers the display unit 120. Thus, the antifungal module 240 facing the display unit 120 emits the antifungal substance "a" according to the light of a wavelength emitted from the display unit 120. The emitted antifungal substance "a" can sterilize contaminants on a surface of the display unit 120.

For example, when the third antifungal mode M3 is set (S330), the third antifungal mode M3 is activated if the antifungal cover 200 is mounted to the body 110. Accordingly, the display unit 120 is made antifungal according to the third antifungal mode M3. That is, when the front cover 220 covers the display unit 120 and a predetermined time period elapses from the moment when the front cover 220 covers the display unit 120, the display unit 120 emits light of a wavelength for a predetermined time period if 10 minutes elapses for example, when the timer is set to 10 minutes. Thus, the antifungal module 240 facing the display unit 120 emits the antifungal substance "a" according to the light of a wavelength emitted from the display unit 120. The emitted antifungal substance "a" can sterilize contaminants on a surface of the display unit 120.

Figure 10:
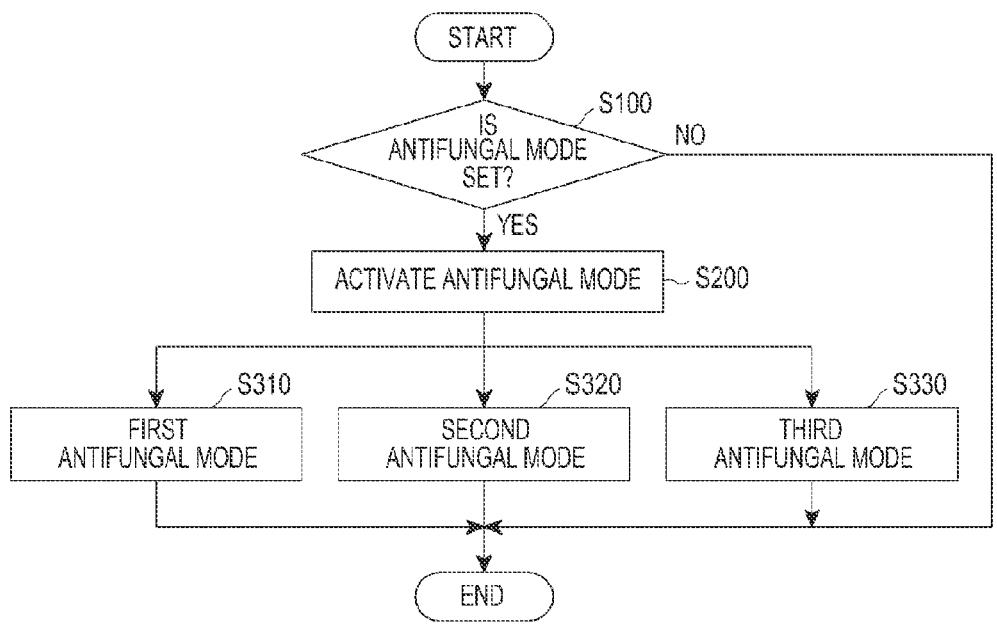
FIG. 10 is a flowchart illustrating an operation of an electronic device including an antifungal cover according to an embodiment of the present invention.

FIG. 10 is a flowchart showing an operation of the electronic device 10 including the antifungal cover 200 according to another embodiment of the present invention.

The difference of the flow of the electronic device 10 including the antifungal cover 200 according to the embodiment of the present invention disclosed in FIG. 10 from the above-described embodiment of the present invention lies in the presence of the detection module 390. Although attachment of the antifungal cover 200 is detected by the detection module 390 and the antifungal mode M is activated in the above-described embodiment of the present invention, the antifungal mode M is activated according to the setting of the user in the present embodiment. Thus, a repeated configuration or description is omitted in the flowchart of the antifungal mode M according to the embodiment of the present invention.

Referring to FIG. 10, first, the user couples the antifungal cover 200 to the body 110, and then the setting of the user is executed, such as through an antifungal application (S100). The controller 170 controls such that the antifungal mode M is activated according to the setting of the user (S200). If a general cover is mounted to the body 110 or the setting of the user is not executed while the antifungal cover 200 is provided, the antifungal mode M of the display unit 120 will not be executed. As described above, if the antifungal mode M is activated through a setting of the user after the antifungal cover 200 is coupled to the body 110, the display unit 120 is made antifungal according to the at least one antifungal mode M set in the electronic device 10 (S310, S320, and S330).

In this way, the electronic device 10 including the antifungal cover according to an embodiment of the present invention can sterilize a surface of the display unit 120 if the antifungal cover 200 covers the display unit 120. Accordingly, a separate antifungal apparatus is not necessary, and the user can sterilize contaminants on the display unit 120 if the display unit 120 is covered by the front cover 220 provided with the antifungal module 240.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device, comprising;
    a body including a display;
    an antifungal cover that is removeably attached to the body, the antifungal cover including an antifungal module on one surface thereof; and
    a controller configured to control
    the display to project a wavelength of light that activates an antifungal property of the antifungal module, when the antifungal cover covers the display, such that the display is made antifungal.

2. The electronic device of claim 1, wherein the antifungal module comprises a photocatalyst.

3. The electronic device of claim 2, wherein the photocatalyst of the antifungal cover comprises titanium dioxide (TiO2).

4. The electronic device of claim 1, further comprising a detection module configured to detect attachment of the antifungal cover to the body.

5. The electronic device of claim 4, wherein the detection module comprises:
    a signal unit provided in the antifungal cover; and
    a detector provided in the body, the detector being configured to engage with the signal unit to detect a signal of the signal unit.

6. The electronic device of claim 5, wherein the controller is further configured to execute the antifungal mode according to a signal recognition value of the detector.

7. The electronic device of claim 6, wherein the antifungal mode comprises at least one of:
    a first antifungal mode in which the antifungal cover covers the display and renders the display antifungal;

a second antifungal mode in which the antifungal cover covers the display and a user causes the display to be rendered antifungal at a time set by the user; and a third antifungal mode in which the antifungal cover covers the display and renders the display antifungal for a first predetermined time period, after a second predetermined time period.

8. The electronic device of claim 7, wherein during the first antifungal mode, if the antifungal cover covers the display, the controller causes the wavelength of light to be projected by the display for the first predetermined time period to render the display antifungal.

9. The electronic device of claim 7, wherein during the second antifungal mode, while the antifungal cover covers the display, the controller causes the wavelength of light to be projected from the display for the first predetermined time period to render the display antifungal at the time set by the user.

10. The electronic device of claim 7, wherein during the third antifungal mode, while the antifungal cover covers the display, the controller causes the wavelength of light to he projected from the display for the first predetermined time period to render the display antifungal if the second predetermined time period elapses.

11. An electronic device, comprising:
a body including a display;
antifungal cover that is removeably attached to the body, the antifungal cover including an antifungal module on one surface thereof;
a detection module configured to detect that the antifungal cover is attached to the body; and
a controller configured to execute an antifungal mode when the detection module detects that the antifungal cover is attached to the body,
wherein, when the antifungal mode is executed, the display provides a wavelength of light that activates an antifungal property of the antifungal module.

12. The electronic device of claim 11, wherein the antifungal mode comprises at least one of:
a first antifungal mode in which the antifungal cover covers the display and renders the display antifungal;
a second antifungal mode in which the antifungal cover covers the display, and a user causes the display to be rendered antifungal at a time set by the user; and
a third antifungal mode in which the antifungal cover covers the display and renders the display antifungal for a first predetermined time period, after a second predetermined time period to render the display antifungal.

13. The electronic device of claim 11, wherein the antifungal module faces the display.

14. The electronic device of claim 11, wherein the antifungal module comprises a photocatalyst including titanium dioxide (TiO2).

15. The electronic device of claim 11, wherein the antifungal cover comprises:
a rear cover coupled to a rear surface of the body; and
a front cover hingedly connected to the rear cover, covering the display, with the front cover including the antifungal module on one a surface thereof that faces the display.

16. The electronic device of claim 15, wherein the detection module comprises:
a detector provided on the rear surface of the body; and
a signal unit provided within the rear cover, the signal unit being configured to provide a signal to the detector.

17. An antifungal cover for an electronic device, the antifungal cover comprising;
a rear cover that couples to a rear surface of the electronic device;
a front cover that is hingedly connected to the rear cover and covers a display on a front surface of the body, when folded closed;
an antifungal module provided on one surface of the front cover facing the display; and
a controller configured to control the display to project a wavelength of light that activates an antifungal property of the antifungal module, when the antifungal cover covers the display, such that the display is made antifungal.

18. The antifungal cover of claim 17, wherein the antifungal module is activated by a wavelength of light emitted from the display.

19. The antifungal cover of claim 18, wherein the antifungal module comprises a photocatalyst including titanium dioxide (TiO2).

20. The antifungal cover of claim 17, further comprising a signal unit provided in the rear cover, the signal unit being configured to provide a signal to the body, such that the body recognizes coupling of the antifungal cover.

* * * * *